US011400655B2

(12) United States Patent
Huang et al.

(10) Patent No.: US 11,400,655 B2
(45) Date of Patent: Aug. 2, 2022

(54) FABRICATION OF OBJECTS HAVING DIFFERENT DEGREE OF SOLIDIFICATION AREAS

(71) Applicant: HEWLETT-PACKARD DEVELOPMENT COMPANY, L.P., Spring, TX (US)

(72) Inventors: Wei Huang, Palo Alto, CA (US); Gary J. Dispoto, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/605,200

(22) PCT Filed: Apr. 30, 2018

(86) PCT No.: PCT/US2018/030297
§ 371 (c)(1),
(2) Date: Oct. 14, 2019

(87) PCT Pub. No.: WO2019/212517
PCT Pub. Date: Nov. 7, 2019

(65) Prior Publication Data
US 2021/0323237 A1    Oct. 21, 2021

(51) Int. Cl.
*B29C 64/393*    (2017.01)
*B33Y 30/00*    (2015.01)
(Continued)

(52) U.S. Cl.
CPC .......... *B29C 64/393* (2017.08); *B33Y 30/00* (2014.12); *B33Y 50/02* (2014.12); *G05B 19/4099* (2013.01); *G05B 2219/49023* (2013.01)

(58) Field of Classification Search
CPC ....... B29C 64/393; B33Y 50/02; B33Y 30/00; G05B 2219/49023; G05B 19/4099
See application file for complete search history.

(56) References Cited

U.S. PATENT DOCUMENTS

| 8,439,998 B2 | 5/2013 | Ito et al. |
| 8,876,443 B2 | 11/2014 | Mirchandani |

(Continued)

FOREIGN PATENT DOCUMENTS

| CN | 105939836 A | 9/2016 |
| CN | 107223077 A | 9/2017 |

(Continued)

OTHER PUBLICATIONS

Myerberg, additive manufacturing with support structure, 2019, google patents, machine translation of JP2019522105A (Year: 2019).*

*Primary Examiner* — Michelle T Bechtold
*Assistant Examiner* — Yvonne Trang Follansbee
(74) *Attorney, Agent, or Firm* — Mannava & Kang

(57) ABSTRACT

According to examples, an apparatus may include a fabricating system, a processor, and on memory on which are stored machine readable instructions. The instructions, when executed by the processor, may cause the processor to control the fabricating system to spread a first layer of build material as part of an object fabrication process, the build material comprising particles or a paste. The instructions may also cause the processor to control the fabricating system to selectively solidify a first area of the layer to a higher degree of solidification than a predefined second area encompassed by the first area, in which the predefined second area has a lower fracture toughness than the first area to propagate a crack in the object more readily than the first area.

15 Claims, 4 Drawing Sheets

(51) Int. Cl.
*B33Y 50/02* (2015.01)
*G05B 19/4099* (2006.01)

(56) References Cited

U.S. PATENT DOCUMENTS

| | | | |
|---|---|---|---|
| 9,296,129 B2 | 3/2016 | Pallari | |
| 9,533,485 B2 | 1/2017 | Marshall et al. | |
| 9,744,720 B2 | 8/2017 | Napadensky | |
| 2015/0014885 A1 | 1/2015 | Hofmann et al. | |
| 2015/0064048 A1 | 3/2015 | Bessac et al. | |
| 2016/0332374 A1 | 11/2016 | Nauka et al. | |
| 2017/0136699 A1 | 5/2017 | Erb et al. | |
| 2017/0297106 A1 | 10/2017 | Myerberg et al. | |
| 2018/0147670 A1* | 5/2018 | Wiggins | B22F 10/20 |
| 2018/0154437 A1* | 6/2018 | Mark | B22F 1/0085 |
| 2018/0169970 A1* | 6/2018 | Harding | B22F 12/00 |
| 2018/0257301 A1* | 9/2018 | Ng | B28B 1/001 |
| 2019/0022923 A1* | 1/2019 | Hofmann | B29C 64/393 |
| 2020/0114426 A1* | 4/2020 | Nesterenko | B22F 10/30 |

FOREIGN PATENT DOCUMENTS

| | | | |
|---|---|---|---|
| CN | 107949470 A | 4/2018 | |
| DE | 10042132 B4 | 12/2012 | |
| JP | 2019522105 A * | 8/2019 | B22F 3/1021 |
| WO | WO2016068899 A1 | 5/2016 | |
| WO | 2016/189312 A2 | 12/2016 | |
| WO | WO2017134676 A1 | 8/2017 | |
| WO | WO2018022034 A1 | 2/2018 | |
| WO | 2018/074993 A1 | 4/2018 | |

* cited by examiner

300

400

NON-TRANSITORY COMPUTER READABLE MEDIUM
500

ACCESS A FILE OF AN OBJECT TO BE FABRICATED, THE FILE INCLUDING DATA IDENTIFYING A PREDEFINED FIRST AREA AND A REDEFINED SECOND AREA ENCOMPASSED BY THE PREDEFINED FIRST AREA
502

CONTROL THE FABRICATING SYSTEM TO FABRICATE THE OBJECT TO INCLUDE THE PREDEFINED FIRST AREA FORMED OF BUILD MATERIAL THAT IS SOLIDIFIED TO A HIGHER DEGREE THAN BUILD MATERIAL IN THE PREDEFINED SECOND AREA
504

*FIG. 5*

FABRICATION OF OBJECTS HAVING DIFFERENT DEGREE OF SOLIDIFICATION AREAS

BACKGROUND

In three-dimensional (3D) printing, an additive printing process is often used to make three-dimensional solid parts from a digital model. Some 3D printing techniques are considered additive processes because they involve the application of successive layers or volumes of a build material, such as a powder or powder-like build material, to an existing surface (or previous layer). 3D printing often includes solidification of the build material, which for some materials may be accomplished through use of heat and/or a chemical binder.

BRIEF DESCRIPTION OF THE DRAWINGS

Features of the present disclosure are illustrated by way of example and not limited in the following figure(s), in which like numerals indicate like elements, in which:

FIG. 5 shows a block diagram of an example non-transitory computer readable medium on which is stored machine readable instructions that are to cause a processor to fabricate an object having a predefined first area and a predefined second area to improve impact resistance of the fabricated object.

DETAILED DESCRIPTION

Figure 1:
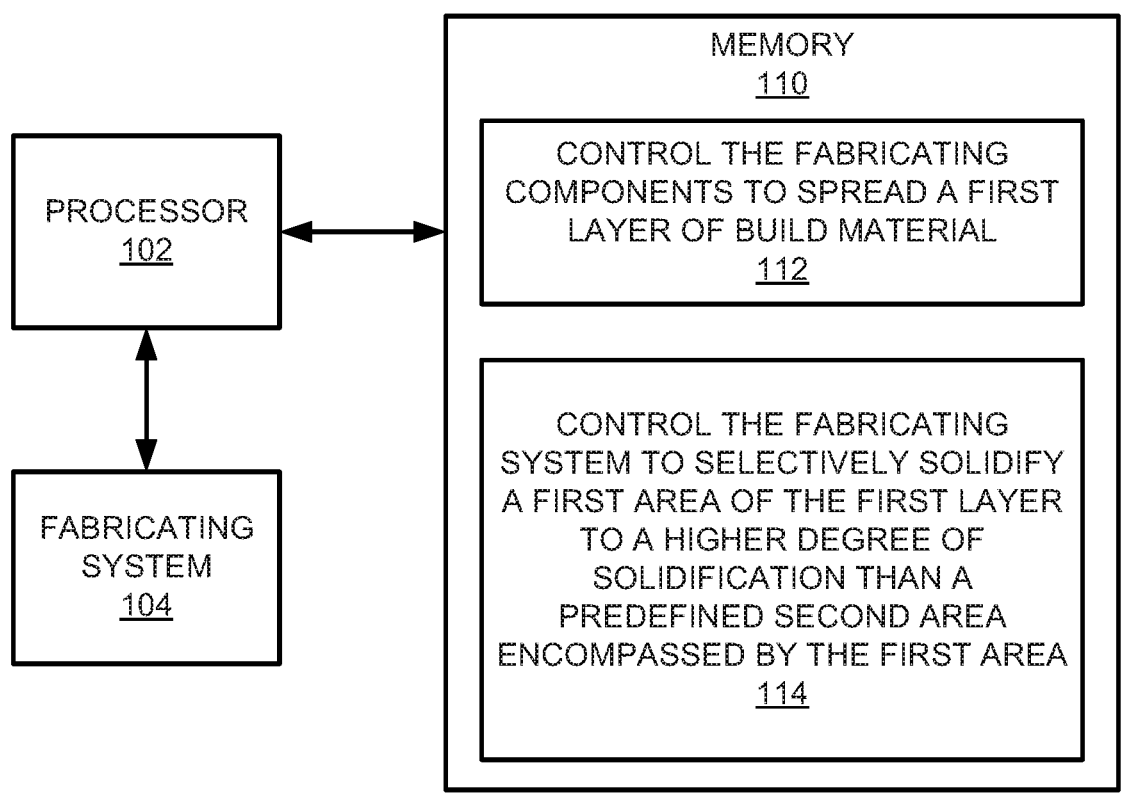
FIG. 1 shows a block diagram of an example apparatus that may cause a second area having a lower degree of solidification to be formed in a fabricated object to improve impact resistance of the fabricated object.

Disclosed herein are apparatuses and methods that may be implemented to fabricate a three-dimensional (3D) object with a first area surrounding a second area, in which the second area may be formed of the same build material as the first area and may be solidified to a lower degree of solidification than the first area. The 3D object may be formed through formation of the first area and second area in multiple layers of the build material. As discussed herein, the 3D object may be fabricated through any of a number of various fabrication processes. In addition, the second area may be fabricated without being solidified or may be partially solidified. In this regard, the term "unsolidified" may be defined herein as being completely unsolidified, being partially solidified, being under-solidified, a fully coagulated state with weaker bonding between particles, or the like. The second area may be solidified to a lower degree than the first area through, for instance, incomplete thermal curing, weaker less binding agent, etc.

As the second area may have a lower density than the first area, the second area may have a lower fracture toughness than the first area. As such, in instances in which an object formed of the first area and the second area is hit with a sufficient force to cause a crack to occur in the object, the energy from the hit may be forced to go through the second area. In addition, because the second area may have a lower fracture toughness than the first area, the energy from the hit may propagate through the second area more readily because propagating through the second area may take less energy than propagating through the first area. According to examples, the second area may be designed to guide the propagation of energy, e.g., crack formation, to detour directions and dead-ends in the first area. Thus, for instance, the second area may be shaped and may be located strategically within the first area to cause cracks to be propagated to predefined first areas, for instance, that are in interior locations of the object. In this manner, the object may be fabricated with greater impact resistance.

In some examples, the apparatuses and methods disclosed herein may fabricate 3D objects with a third area that is encompassed by the first area, in which the third area may be solidified to a lower degree of solidification than the first area and the second area. In these examples, the third area may be outside of the second area or may be encompassed within the second area. In any regard, the third area may have a lower density than the second area and thus, energy from an impact on an object containing the first area, the second area, and the third area may propagate through the third area more readily than the first area or the second area. In examples, the third area may also be shaped and may be located strategically within the first area (and/or the second area) to cause cracks to be propagated to predefined first areas, for instance, that are in interior locations of the object. In this manner, the object may be fabricated with greater impact resistance. The apparatuses and methods disclosed herein may fabricate 3D objects with additional areas that are encompassed by the first area, in which the additional areas may be solidified to lower degrees of solidification than the first area, the second area, and the third area. Accordingly, although particular reference is made herein to a first area and a second area, it should be understood that additional areas having additional degrees of solidification may be formed in the fabricated 3D objects without departing from a scope of the present disclosure.

Before continuing, it is noted that as used herein, the terms "includes" and "including" mean, but is not limited to, "includes" or "including" and "includes at least" or "including at least." The term "based on" means "based on" and "based at least in part on."

Figure 2:
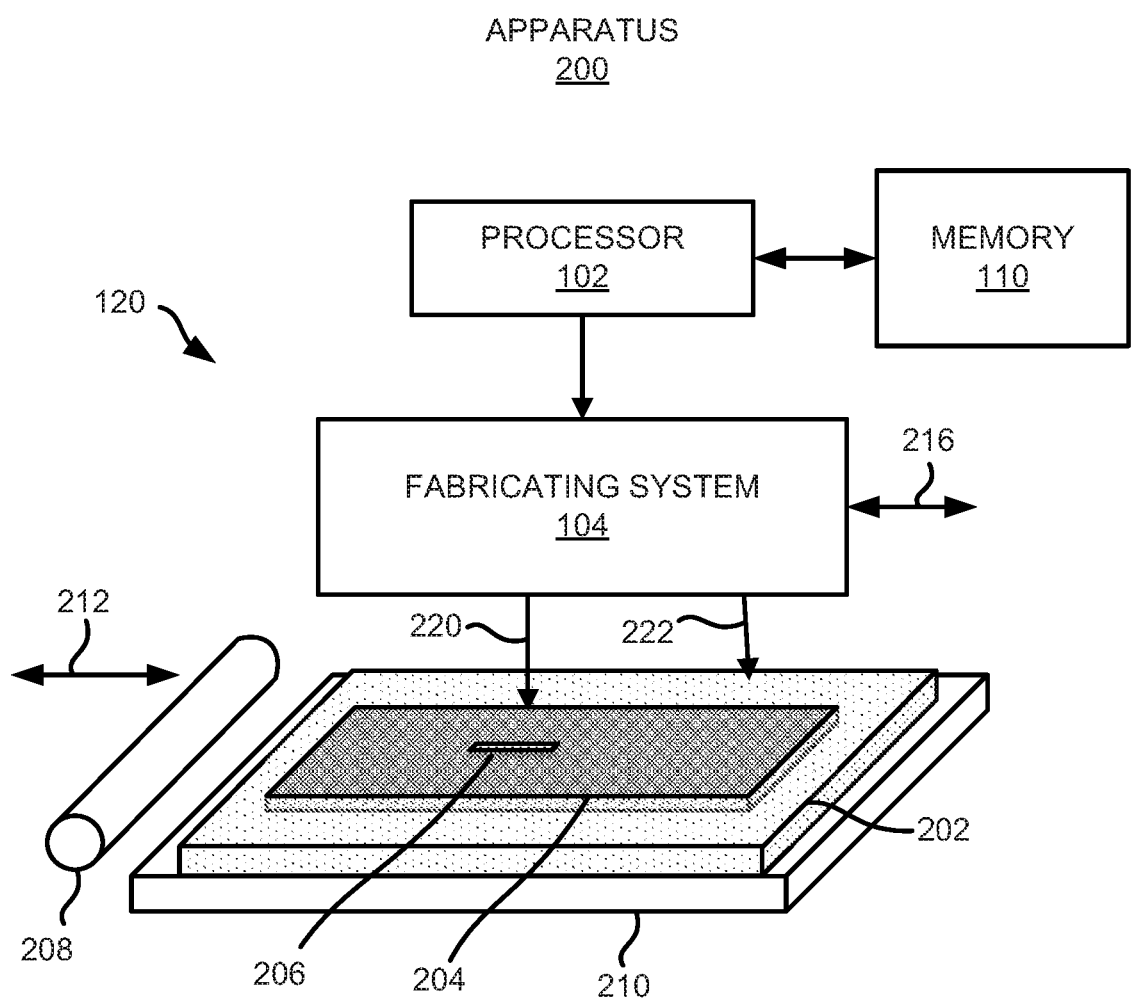
FIG. 2 shows a block diagram of another example apparatus that may cause a second area having a lower degree of solidification to be formed in a fabricated object to improve impact resistance of the fabricated object.

Reference is first made to FIGS. 1 and 2. FIG. 1 shows a block diagram of an example apparatus 100 that may cause a second area having a lower degree of solidification to be formed in a fabricated object to improve impact resistance of the fabricated object. FIG. 2 shows a block diagram of another example apparatus 200, such as a 3D fabrication system, that may also cause a second area having a lower degree of solidification to be formed in a fabricated object to improve impact resistance of the fabricated object. It should be understood that the example apparatuses 100 and 200 depicted in FIG. 1 and may include additional features and that some of the features described herein may be removed and/or modified without departing from the scopes of the apparatuses 100 and 200.

Generally speaking, the apparatuses 100, 200 depicted in FIGS. 1 and 2 may each be a 3D fabricating system. The apparatuses 100, 200 may also be termed a 3D printer, a 3D fabricator, or the like. Generally speaking, the 3D apparatuses 100, 200 may be implemented to fabricate 3D objects from build material. The build material 202 may be a material that may be applied in layers and selectively solidified. For instance, the build material 202 may include particles of material (e.g., in the form of a powder), a paste material, or the like. The build material 202 has been shown in FIG. 2 as being partially transparent to enable a first area 204 and a second area 206 to be visible. It should thus be understood that the build material 202 may not be transparent, but instead, may be opaque.

In instances in which the build material 202 includes particles of material, the particles of build material may include any material suitable for melting and selective solidification, including, but not limited to, a polymer, a plastic, a ceramic, a nylon, a metal, combinations thereof, or the like, and may be in the form of a powder or a powder-like material. Additionally, the particles may be formed to have dimensions, e.g., widths, diameters, or the like, that are generally between about 5 μm and about 100 μm. In other examples, the particles may have dimensions that are generally between about 30 μm and about 60 μm. The particles may have any of multiple shapes, for instance, as a result of larger particles being ground into smaller particles. In some examples, the powder may be formed from, or may include, short fibers that may, for example, have been cut into short lengths from long strands or threads of material.

The apparatuses 100, 200 may include a processor 102 that may respectively control operations of the apparatuses 100, 200. The processor 102 may be a semiconductor-based microprocessor, a central processing unit (CPU), an application specific integrated circuit (ASIC), a field-programmable gate array (FPGA), and/or other suitable hardware device. The apparatuses 100, 200 also may include a fabricating system 104 that the processor 102 may control in the fabrication of 3D objects. Particularly, and as discussed in greater detail herein, the processor 102 may control the fabricating system 104 to selectively solidify a predefined first area 204 of the build material 202 to have a higher degree of solidification than a predefined second area 206 (e.g., less than fully solidified, partially solidified, in powder form, or the like).

The apparatuses 100, 200 may also include a memory 110 that may have stored thereon machine readable instructions 112 and 114 (which may also be termed computer readable instructions) that the processor 102 may execute. The memory 110 may be an electronic, magnetic, optical, or other physical storage device that contains or stores executable instructions. The memory 110 may be, for example, Random Access memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals.

The processor 102 may fetch, decode, and execute the instructions 112 to control the fabricating system 104 to spread a layer of build material 202 as part of an object fabrication process. For instance, the fabricating system 104 may include a recoater 208 that may be controlled to spread a layer of build material 202 on a build platform 210, which may be in a build chamber within which 3D objects may be fabricated from the build material 202 provided in respective layers on the build platform 210. Particularly, the build platform 210 may be provided in a build chamber of a 3D fabrication system and may be moved downward as features of a 3D object are formed in successive layers of the build material 202. Although not shown, the build material 202 may be supplied between the recoater 208 and the build platform 210 and the recoater 208 may be moved in a direction represented by the arrow 212 across the build platform 210 to spread the build material 202 into a layer.

The processor 102 may fetch, decode, and execute the instructions 114 to control the fabricating system 104 to selectively solidify a first area 204 of the layer to a higher degree of solidification than a predefined second area 206 encompassed by the first area 204. For instance, the processor 102 may access a file that may include data identifying the first area 204 and the predefined second area 206. The second area 206 may be predefined in that the data in the file may specify the dimensions, e.g., shape, and location at which the second area 206 is to be formed within the first area 204. The data in the file may also specify the level to which the build material 202 in the second area 206 is to be solidified. For instance, the data may specify that the build material 202 may be completely unsolidified, may be solidified to a certain percentage that is less than 100%, or other levels therebetween.

The processor 102 may repeat execution of the instructions 112 and 114 to fabricate additional layers of build material 202 having respective first areas 204 and second areas 206 until, for instance, the object is fabricated. In addition, the second areas 206 in adjacent layers may be connected to each other such that the second areas 206 may form a feature that extends in three dimensions and across multiple layers. The processor 102 may also control the fabricating system 104 to form a plurality of second areas 206 in the fabricated object, in which the second areas 206 may be positioned within the object to maximize damage reduction to the object caused by impact on the object, e.g., maximize impact resistance. In addition, the second area 206 may be formed of the same build material 202 as the first area 204, but may have greater porosity, may be weaker, etc., than the first area 204.

According to examples, the fabricating system 104 may include an energy supplying component for selectively solidifying the build material 202 through application of solidifying energy onto the build material 202. The solidifying energy may be in the form of light (visible, infrared, ultraviolet, or the like), in the form of heat, in the form of electromagnetic energy, combinations thereof, or the like. By way of example, the energy supplying component may include a laser beam source, a heating component, or the like. In some examples, the processor 102 may control the energy supplying component to melt or sinter the build material 202 in the first area 204. In addition, as the build material 202 particles in the first area 204 are heated, at least some of the particles in the second area 206 may melt (or sinter) and fuse together through thermal bleed from the particles in the first area 204. In some examples, the width of the second area 206 may be sized based on an intended degree of solidification of the particles in the second area 206. For instance, the width of the second area 206 may be of sufficiently large size to enable a portion of the second area 206 to remain unsolidified following receipt of heat through thermal bleed from the particles in the first area 204. By way of particular example, the width of the second area 206 may be defined based on an amount of heat predicted to occur through thermal bleed and the effects of that heat on the solidification of the particles in the second area 206, e.g., the width of the second area 206 may be optimized to control the degree of solidification occurring on the particles in the second area 206.

However, in other examples, the build material 202 particles in the second area 206 may be solidified to a certain level that is greater than a level than may be achieved through absorption of heat through thermal bleeding of the build material 202 particles in the first area 204. In these examples, the processor 102 may control the energy supplying component to apply a first amount of solidifying energy onto the particles in the first area 204 and to apply a second amount of solidifying energy onto the particles in the second area 206, in which the second amount of solidifying energy is lower than the first amount of solidifying energy. Thus, for instance, the build material 202 in the second area 206 may be solidified to a lower degree of solidification than the build material 202 in the first area 204.

According to examples in which the build material 202 includes particles and the fabricating system 104 includes a heating component to apply solidifying energy onto the layer of build material 202, the processor 102 may control the heating component, e.g., a laser beam source, to selectively apply solidifying energy onto the layer, as represented by the arrow 220. That is, the processor 102 may control the heating component to selectively apply solidifying energy onto the build material 202 particles located in the first area 204 of the layer. Additionally, the processor 102 may control the heating component to avoid application of solidifying energy onto the build material 202 particles located in the second area 206 of the layer. However, as the build material 202 particles in the first area 204 are heated, at least some of the particles in the second area 206 may melt or sinter and through receipt of heat from thermal bleed from the particles in the first area 204.

According to examples in which the build material 202 includes particles and the fabricating system 104 includes a solidifying agent delivery component that the processor 102 may control to selectively apply solidifying agent onto the layer, as represented by the arrow 222. The solidifying agent may be an ink, a binder, or the like. The solidifying agent delivery component may be a fluid delivery device, such as a printhead. In some examples, the solidifying agent may be a chemical binder that may bind particles on which the solidifying agent is deposited to bind together. In other examples, the solidifying agent may be a liquid, such as an ink, a pigment, a dye, or the like, that may enhance absorption of energy. In either of these examples, the processor 102 may control the solidifying agent delivery component to deliver the solidifying agent in the form of droplets onto selected areas of the layer such that the droplets of solidifying agent may be dispersed on the particles and within interstitial spaces between the particles in the selected areas.

The fabricating system 104 may also include an energy supply component that may supply energy 220 at a level that is insufficient to cause the particles upon which the solidifying agent has not been deposited to remain below the melting point temperature of the particles. In addition, the droplets of solidifying agent may be supplied at a sufficient density onto the particles in the first area 204, e.g., contone level, to enhance absorption of sufficient energy to cause the temperature of the particles on which the solidifying agent has been deposited to increase to a level that is above a melting point temperature of the particles.

In examples in which the build material 202 particles in the second area 206 are to remain completely unsolidified or lightly solidified, the processor 102 may control the solidifying agent delivery component to deliver the solidifying agent onto the build material 202 particles located in the first area 204 without depositing the solidifying agent onto the build material 202 particles located in the second area 206. In addition, the processor 102 may control the energy supply component to supply energy 220 onto the layer of build material 202 particles, which may cause the particles in the first area 204 to melt or sinter and subsequently fuse together. For instance, after the particles have melted or sintered, the particles may fuse together as the particles are cooled. In these examples, at least some of the build material 202 particles in the second area 206 may melt or sinter through receipt of heat from the build material 202 particles in the first area 204 and subsequently fuse together.

However, in other examples, the build material 202 particles in the second area 206 may be solidified to a certain level that is greater than a level that may be achieved through absorption of heat through thermal bleeding of the build material 202 particles in the first area 204. In these examples, the processor 102 may control the solidifying agent delivery component to deliver solidifying agent onto the build material 202 particles located in the second area 206 in a smaller concentration level than the solidifying agent delivered onto the build material 202 particles located in the first area 204. In addition, the processor 102 may control the energy supply component to supply energy 220 onto the layer of build material 202 particles, which may cause the particles in the first area 204 to melt or sinter and some of the particles in the second area 206 to melt or sinter. The melted or sintered particles may become solidified with neighboring particles as the melted or sintered particles cool. Thus, for instance, the second area 206 may be partially solidified.

According to examples, the fabricating system 104 may include a detailing agent delivery component to selectively deliver a detailing agent onto the build material 202 layer. The detailing agent, which may also be termed a cooling agent, a defusing agent, or the like, may cool the particles on which the detailing agent has been deposited to reduce a level of melting or sintering of the particles. The processor 102 may control the detailing agent delivery component to deliver detailing agent onto particles in the second area 206 to reduce melting or sintering of those particles and to thus, maintain the particles in the second area 206 in an unsolidified or a partially solidified state. By way of particular example, the processor 102 may control the detailing agent delivery component to deliver detailing agent onto the particles in the second area 206 in instances in which the second area 206 has a sufficiently small dimension that thermal bleed from the first area 204 may cause the particles in the second area 206 to melt or sinter and solidify without the detailing agent. That is, the detailing agent may be applied to cause the particles in the second area 206 to solidify to a lower degree of solidification than the particles in the first area 204.

According to examples, the fabricating system 104 may be moved across the build platform 210 as indicated by the arrow 216 to be positioned over multiple areas of the build material 202 layer. In this regard, the fabricating system 104 may selectively solidify multiple areas of the build material 202 layer. For instance, the fabricating system 104 may be supported on a carriage that is to move in the directions 216. In some examples, the recoater 208 may be provided on the same carriage.

In other examples, instead of the memory 110, the apparatus 100, 200 may include hardware logic blocks that may perform functions similar to the instructions 112 and 114. In yet other examples, the apparatuses 100, 200 may include a combination of instructions and hardware logic blocks to implement or execute functions corresponding to the instructions 112 and 114. In any of these examples, the processor 102 may implement the hardware logic blocks and/or execute the instructions 112 and 114.

Figure 3:
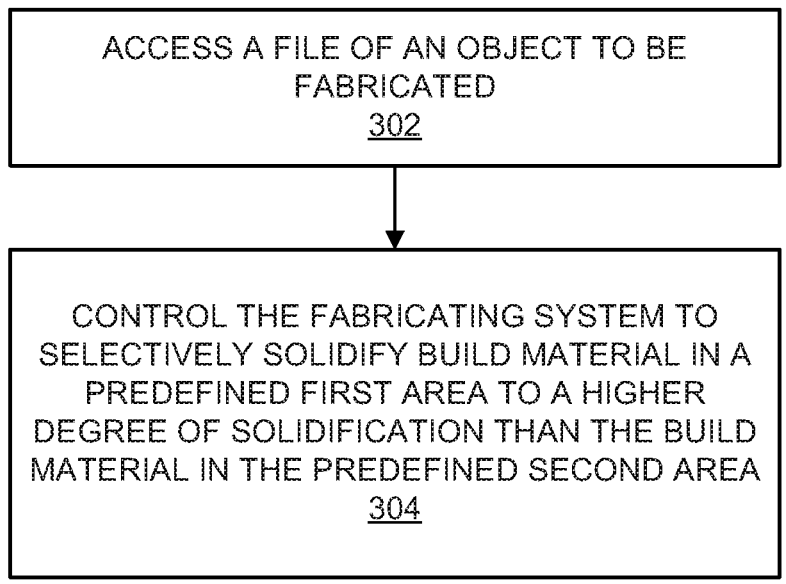
FIG. 3 depicts a flow diagram of an example method to cause a second area to be formed in a fabricated object to improve impact resistance of the fabricated object.

Various manners in which the processor 102 may operate are discussed in greater detail with respect to the method 300 depicted in FIG. 3. Particularly, FIG. 3 depicts a flow diagram of an example method 300 to cause a second area to be formed in a fabricated object to improve impact resistance of the fabricated object. It should be understood that the method 300 depicted in FIG. 3 may include additional operations and that some of the operations described therein may be removed and/or modified without departing from scope of the method 300. The description of the method 300 is made with reference to the features depicted in FIGS. 1 and 2 for purposes of illustration.

At block 302, the processor 102 may access a file of an object to be fabricated, for instance, by the apparatus 100, 200. The file may include data identifying a predefined first area 204 and a predefined second area 206 within the first area 204. The predefined first area 204 may be an area of the object that is to be fully solidified and the predefined second area 206 may be an area of the object that is to be partially solidified or unsolidified.

At block 304, the processor 102 may control a fabricating system 104 to selectively solidify build material 202 in the predefined first area 204 to a higher degree of solidification than the build material 202 in the predefined second area 206. As discussed herein, the processor 102 may control the fabricating system 104 in any of a number of different manners to solidify the build material 202 in the predefined first area 204 to a higher degree of solidification than the build material 202 in the predefined second area 206. In other words, the processor 102 may control the fabricating system 104 to form the predefined second area 206 to be less solidified, e.g., more porous, than the predefined first area 204. As a result, for instance, the predefined second area 206 may have a lower fracture toughness than the predefined first area 204, which may cause the predefined second area 206 to propagate a crack in the object more readily than the predefined first area 204.

By way of example, when an object formed of the predefined first area 204 and the predefined second area 206 is hit with a sufficient force to cause a crack to occur in the object, the energy from the hit may be forced to go through the predefined second area 206. Because the predefined second area 206 may have a lower fracture toughness than the predefined first area 204, the energy may propagate through the predefined second area 206 because propagating through the predefined second area 206 may take less energy than propagating through the predefined first area 204. In one regard, the predefined second area 206 may be designed to guide the propagation of energy, e.g., crack formation, to detour directions and dead-ends in the predefined first area 204. Thus, for instance, the predefined second area 206 may have shapes and may be located strategically within the predefined first area 204 to cause cracks to be propagated to predefined first areas 204 that are in interior locations of the object. In this manner, the object may be able to withstand harder hits without causing external locations of the object to crack.

The shape and the location of the predefined second area 206 may be determined and the predefined second area 206 may be formed in the object to maximize damage reduction to the object caused by an impact onto the object. The shape and location of the predefined second area 206 may be based upon, for instance, the shape of the object, the build material used to fabricate the object, the fabrication process implemented, the intended level of impact resistance, or the like. In addition or in other examples, the shape and location of the predefined second area 206 may be determined through testing of various shapes and locations and determining a shape and location that results in the maximum damage reduction to the object. In any regard, the determined shape and location of the predefined second area 206 may be stored in the file as data pertaining to the fabrication of the object.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 4:
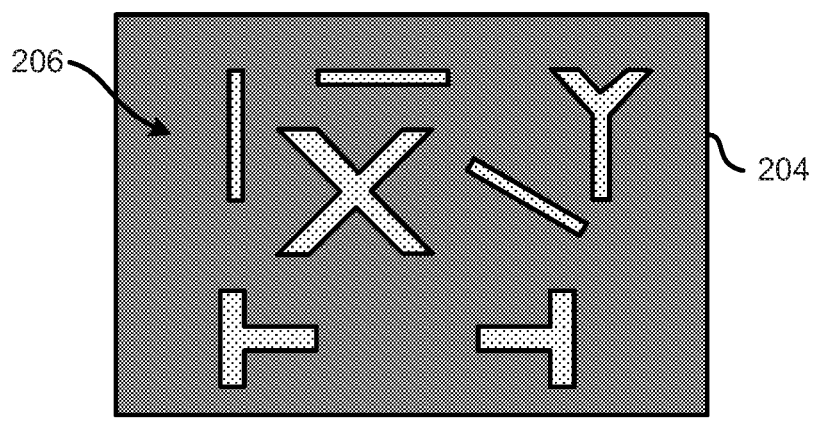
FIG. 4 shows a cross-sectional side view of an example object fabricated to include a predefined first area and predefined second areas.

Turning now to FIG. 4, there is shown a cross-sectional side view of an example object 400 fabricated to include a predefined first area 204 and predefined second areas 206. It should be understood that the example object 400 depicted in FIG. 4 may include additional features and that some of the features described herein may be removed and/or modified without departing from a scope of the object 400.

As shown in FIG. 4, the object 400 may be fabricated to include predefined second areas 206 that have any of a plurality of a variety of shapes and may be positioned in any of a plurality of locations within the predefined first area 204. For instance, the predefined second areas 206 may extend horizontally, vertically, or diagonally. The predefined second areas 206 may additionally have elongated shapes, X-shapes, Y-shapes, T-shapes, or the like. As a further example, the predefined second areas 206 may form a lattice structure, may be connected to each other, or the like. In any regard, the second areas 206 may have shapes and may be positioned to maximize damage reduction to the object 400 caused by an impact onto the object.

With reference now to FIG. 5, there is shown a block diagram of an example non-transitory computer readable medium 500 on which is stored machine readable instructions that are to cause a processor to fabricate an object having a predefined first area 204 and a predefined second area 206 to improve impact resistance of the fabricated object. It should be understood that the example non-transitory computer readable medium 500 depicted in FIG. 5 may include additional features and that some of the features described herein may be removed and/or modified without departing from a scope of the object 500. The description of the non-transitory computer readable medium 500 is made with reference to FIGS. 1-4.

The machine-readable storage medium 500 may be an electronic, magnetic, optical, or other physical storage device that contains or stores executable instructions. The machine-readable storage medium 500 may be, for example, Random Access memory (RAM), an Electrically Erasable Programmable Read-Only Memory (EEPROM), a storage device, an optical disc, and the like.

The non-transitory machine-readable storage medium 500 may have stored thereon machine readable instructions 502 and 504 that a processor, e.g., the processor 102, may execute. The machine readable instructions 502 may cause the processor to access a file of an object 400 to be fabricated. The file may include data identifying a predefined first area 204 and a predefined second area 206 encompassed by the predefined first area 204 in the object 400. In addition, the data may indicate that the predefined first area 204 is to be solidified to a higher degree of solidification than the predefined second area 206.

The machine readable instructions 504 may cause the processor to control a fabricating system 104 to fabricate the object 400 to include the predefined first area 204 formed of build material that is solidified to a higher degree than build material in the predefined second area 206 through fabrication of layers of build material 202. As discussed herein, as the predefined second area 206 may not be fully solidified, the predefined second area 206 may have a lower fracture toughness than the predefined first area 204. As a result, the predefined second area 206 may more readily propagate a crack in the object 400 than the predefined first area 204, which may improve impact resistance of the object 400. As also discussed herein, the predefined second area 206 may be shaped and positioned to maximize damage reduction to the object.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a fabricating system;
   a processor; and
   a memory on which are stored machine readable instructions that when executed by the processor, cause the processor to:
   access data of an object to be fabricated by the fabricating system, the data of the object identifying layers to be fabricated, each layer including a first area of build material to be fully solidified and a second area of the build material within the first area to be partially solidified,
   control the fabricating system to spread a first layer of build material as part of a fabrication process of the object, and
   control the fabricating system to:
   selectively solidify a first area of the first layer to a full solidification according to the data of the object; and
   selectively solidify a second area of the first layer to a partial solidification according to the data of the object, wherein the second area is encompassed within the first area in the first layer, and wherein the partial solidification of the second area causes the second area to propagate a crack in the object by detouring directions or dead-ends of the crack.

2. The apparatus of claim 1, wherein the instructions are further executable to cause the processor to:
   control the fabricating system to spread a second layer of build material; and
   control the fabricating system to selectively solidify a first area in the second layer of the build material to a full solidification and a second area within the first area in the second layer to a partial solidification, the second area in the second layer being joined to the second area in the first layer.

3. The apparatus of claim 1, wherein the build material comprises particles, and wherein to control the fabricating system to selectively solidify the first area, the instructions are further executable to cause the processor to:
   control the fabricating system to apply solidifying energy onto the first layer, wherein the solidifying energy causes the particles in the first area to melt or sinter and subsequently solidify, wherein at least some of the particles in the second area are to melt or sinter through thermal bleed from the particles in the first area and subsequently solidify to a lower degree of solidification than the first area.

4. The apparatus of claim 1, wherein the build material comprises particles, and wherein to control the fabricating system to selectively solidify the first area and to selectively solidify the second area, the instructions are further executable to cause the processor to:
   control the fabricating system to deposit a solidifying agent onto the particles in the first area of the first layer at a first coverage level;
   control the fabricating system to deposit the solidifying agent onto the particles in the second area of the first layer at a second coverage level, wherein the second coverage level is lower than the first coverage level; and
   control the fabricating system to apply solidifying energy onto the first layer, wherein the solidifying energy causes the particles in the first area to melt or sinter and subsequently solidify and to cause the particles in the second area to melt or sinter and subsequently solidify to a tower degree of solidification than the particles in the first area.

5. The apparatus of claim 1, wherein the build material comprises particles, and wherein to control the fabricating system to selectively solidify the first area, the instructions are further executable to cause the processor to
   control the fabricating system to deposit a detailing agent onto the particles in the second area; and
   control the fabricating system to apply solidifying energy onto the first layer, wherein the solidifying energy causes the particles in the first area to melt or sinter and wherein the detailing agent is to reduce a level of melting or sintering of the particles in the second area caused through application of the solidifying energy onto the first layer.

6. The apparatus of claim 1, wherein instructions are further executable to cause the processor to:
   control the fabricating system to apply a first amount of solidifying energy onto the first area; and
   control the fabricating system to apply a second amount of solidifying energy onto the second area, the second amount of solidifying energy being lower than the first amount of solidifying energy.

7. The apparatus of claim 1, wherein instructions are further executable to cause the processor to:
   control the fabricating system to form a plurality of second areas in the object, wherein the plurality of second areas are positioned within the object to maximize damage reduction to the object caused by an impact onto the object.

8. A method comprising:
   accessing, by a processor, data of an object to be fabricated, the data identifying layers to be fabricated, each layer including a predefined first area to be fully solidified and a predefined second area to be partially solidified, the predefined second area to be encompassed within the predefined first area; and controlling, by the processor, a fabricating system to:
selectively solidify build material in the predefined first area of a first layer of build material to a full solidification according to the data of the object; and
selectively solidify build material in the predefined second area of the first layer of build material to a partial solidification according to the data of the object, wherein the predefined second area is encompassed within the predefined first area in the first layer of build material, and wherein the partial solidification of the predefined second area causes the predefined second area to propagate a crack in the object by detouring directions or dead-ends of the crack.

9. The method of claim 8, further comprising:
controlling the fabricating system to form a plurality of predefined second areas in the object, wherein the plurality of predefined second areas are positioned within the object to maximize damage reduction to the object caused by an impact onto the object.

10. The method of claim 8, wherein the build material comprises particles, the method further comprising:
controlling the fabricating system to apply solidifying energy to cause the particles in the predefined first area to melt or sinter and subsequently solidify, wherein at least some of the particles in the predefined second area are to melt or sinter through thermal bleed from the particles in the predefined first area and subsequently solidify to a lower degree of solidification than the predefined first area.

11. The method of claim 8, wherein the build material comprises particles, the method further comprising:
controlling the fabricating system to deposit a solidifying agent onto the particles in the predefined first area at a first coverage level;
controlling the fabricating system to deposit the solidifying agent onto the particles in the predefined second area at a second coverage level, wherein the second coverage level is lower than the first coverage level; and
controlling the fabricating system to apply solidifying energy to cause the particles in the predefined first area to melt or sinter and to cause some of the particles in the predefined second area to melt or sinter and subsequently solidify to a lower degree of solidification than the particles in the predefined first area.

12. The method of claim 8, wherein the build material comprises particles, and wherein the method further comprises:

controlling the fabricating system to deposit a detailing agent onto the particles in the predefined second area; and controlling the fabricating system to apply solidifying energy to cause the particles in the predefined first area to melt or sinter and wherein the detailing agent is to reduce a level of melting or sintering of the particles in the predefined second area caused through application of the solidifying energy onto the particles in the predefined second area.

13. The method of claim 8, further comprising:
controlling the fabricating system to apply a first amount of solidifying energy to form the predefined first area; and
controlling the fabricating system to apply a second amount of solidifying energy to form the predefined second area, the second amount of solidifying energy being lower than the first amount of solidifying energy.

14. A non-transitory computer readable medium storing machine readable instructions that when executed by a processor, cause the processor to:
access data of an object to be fabricated, the data of the object identifying layers to be fabricated, each layer including a predefined first area to be fully solidified and a predefined second area to be partially solidified, the predefined second area to be encompassed within the predefined first area; and
control a fabricating system to:
selectively solidify build material in the predefined first area of a first layer of build material to a full solidification according to the data of the object; and
selectively solidify build material in the predefined second area of the first layer of build material to a partial solidification, wherein the predefined second area is encompassed within the predefined first area in the first layer of build material, and wherein the partial solidification of the predefined second area causes the predefined second area to propagate a crack in the object by detouring directions or dead-ends of the crack.

15. The non-transitory computer readable medium of claim 14, wherein the instructions are further executable to cause the processor to:
control the fabricating system to form a plurality of predefined second areas in the object, wherein the plurality of predefined second areas are positioned within the object to maximize damage reduction to the object caused by an impact onto the object.

* * * * *